US006772023B1

(12) United States Patent
Imai

(10) Patent No.: US 6,772,023 B1
(45) Date of Patent: Aug. 3, 2004

(54) APPARATUS FOR TONE CONTROL AND RECORDING MEDIUM OF TONE CONTROL PROGRAM

(75) Inventor: Takeshi Imai, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 782 days.

(21) Appl. No.: 09/594,876

(22) Filed: Jun. 15, 2000

(30) Foreign Application Priority Data

Jun. 22, 1999 (JP) .......................................... 11-175255

(51) Int. Cl.[7] ................................................ G06F 17/00
(52) U.S. Cl. ......................................... 700/94; 711/217
(58) Field of Search .............................. 700/94; 381/61, 381/18; 711/217, 220; 346/31; 348/717, 609, 714, 716; 712/36, 1, 32

(56) References Cited

U.S. PATENT DOCUMENTS 4,628,789 A 12/1986 Fujimori
5,210,806 A 5/1993 Kihara et al.
5,257,313 A 10/1993 Fujishita et al.
5,410,603 A 4/1995 Ishiguro et al.
5,463,691 A 10/1995 Nakae et al.
5,546,466 A 8/1996 Ishiguro et al.
5,590,364 A 12/1996 Hanzawa et al.
6,629,111 B1 * 9/2003 Stine et al. ................. 707/205
6,704,833 B2 * 3/2004 Huck ............................ 711/3

* cited by examiner

*Primary Examiner*—Duc Nguyen
*Assistant Examiner*—Lun-See Lao
(74) *Attorney, Agent, or Firm*—Frishauf, Holtz, Goodman & Chick, P.C.

(57) ABSTRACT

A storage of DSP receives and stores a plurality of signal processing modules according to which a digital tone signal is processed. Each signal processing module includes a plurality of data groups (e.g., program, fixed data, work data). The storage has a plurality of storage areas, each assigned to a different one of the data groups. Each storage area is divided into a plurality of division areas for the plurality of signal processing modules. DSP receives address qualifying information on the difference between the size of a specified data groups (e.g., work data) for a signal processing module and the size of a specified division area which stores the specified data group. DSP sequentially executes the plurality of signal processing modules. When it has completed executing of the current signal processing module, DSP uses the address qualifying information to determine the start address of the specified division area for the next signal processing module.

8 Claims, 10 Drawing Sheets

APPARATUS FOR TONE CONTROL AND RECORDING MEDIUM OF TONE CONTROL PROGRAM

BACKGROUND OF THE INVENTION

The present invention relates to apparatus for control tones and record media of a tone control program.

Recent electronic musical instruments use a single digital signal processor (DSP) to perform a plurality of tone control or processing functions, such as tone generation and sound effects processing, in place of a plurality of dedicated hardware circuits.

As well known in the art, DSP executes a program involving signal processing algorithms to accomplish the desired signal processing functions. The signal processing algorithms include processing information (program instructions and fixed data) and information to be processed (work data) and they are stored in a read-write storage, such as RAM. The program is loaded into the storage to provide DSP with the desired signal processing functions.

When it is desired to change the signal processing functions of DSP, or even part thereof, it is necessary to prepare a new program. This is troublesome and wasteful.

A module-based system might be proposed. In accordance with the module-based system, each of the signal processing functions is arranged so as to correspond to a module which includes processing information and information to be processed. In place of loading the composite program, the system load a plurality of modules into storage of DSP. The modules reside in unique or different storage areas, called, "division areas" from one another, and independently manage their own storage areas. With the module-based system, it is much easier to modify part of the signal processing functions of DSP.

The module-based system using the independent storage management has the problem of addressing when DSP operation shifts from one module to another. Specifically, when it completes execution of a module, DSP must determine a start address of the next module, for instance, start address of a work area which stores work data to be processed by the next module. The work area start address of the next module might be obtained by incrementing the work area last address of the current module that stores work data last processed by the current module on the condition that size of work data handled by the current module be the same as size (storage capacity) of the work area. For convenience of module software preparation, it is often to reserve a work area which is greater in size than work data actually required. In such a case, the incremented address cannot point to the start location of the next work area. As a result, DSP cannot accomplish the required signal processing functions.

SUMMARY OF THE INVENTION

An object of the invention is to provide an apparatus for tone control which can sequentially and successfully execute a plurality of signal processing modules without exerting the addressing problem.

A specific object of the invention is to provide an apparatus for tone control which allows work areas greater in size than required work data and yet can successfully address the next work area during the operation when the current signal processing module using the current work area has been executed.

Another object of the invention is to provide a record medium of a tone control program readable by a computer which can sequentially and successfully execute a plurality of signal processing modules without exerting the addressing problem.

In accordance with an aspect of the invention, there is provided an apparatus for tone control which comprises:

storage means for storing a plurality of signal processing modules representative of algorithms according to which a tone signal is processed, each of said plurality of signal processing modules including a plurality of data groups;

said storage means including a plurality of storage areas, each divided into a plurality of division areas for said plurality of signal processing modules and assigned to a different one of said plurality of data groups;

transfer means for transferring said plurality of signal processing modules to said storage means in such a manner that corresponding division areas in said plurality of storage areas store one of said plurality of signal processing modules;

signal processing means for sequentially executing said plurality of signal processing modules to thereby processing the tone signal; and address control means for transferring to said signal processing means address qualifying information on difference between size of a specified data group for a signal processing module and size of a specified division area that stores said specified data group for said signal processing module to thereby causing said signal processing means to determine, when having completed execution of said signal processing module, a start address of said specified division area for the next signal processing module from said address qualifying information.

With this arrangement, when it has completed execution of a signal processing module, the signal processing means can successfully address the next specified division area (e.g., work area) for the next signal processing module by using the address qualifying information.

A further aspect of the invention provides a record medium of a tone control program readable by a computer, the tone control program controlling the computer to function as:

storage means for storing a plurality of signal processing modules representative of algorithms according to which a tone signal is processed, each of said plurality of signal processing modules including a plurality of data groups;

said storage means including a plurality of storage areas, each divided into a plurality of division areas for said plurality of signal processing modules and assigned to a different one of said plurality of data groups;

transfer means for transferring said plurality of signal processing modules to said storage means in such a manner that corresponding division areas in said plurality of storage areas store one of said plurality of signal processing modules;

signal processing means for sequentially executing said plurality of signal processing modules to thereby processing the tone signal; and address control means for transferring to said signal processing means address qualifying information on difference between size of a specified data group for a signal processing module and size of a specified division area that stores said specified data group for said signal processing module to thereby causing said signal processing means to determine, when having completed execution of said signal processing module, a start address of said specified division area for the next signal processing module from said address qualifying information.

DETAILED DESCRIPTION OF PREFERRED EMBODIMENTS

The invention is now described in more detail with respect to preferred embodiments taken in conjunction with the accompanying drawings.

Figure 1:
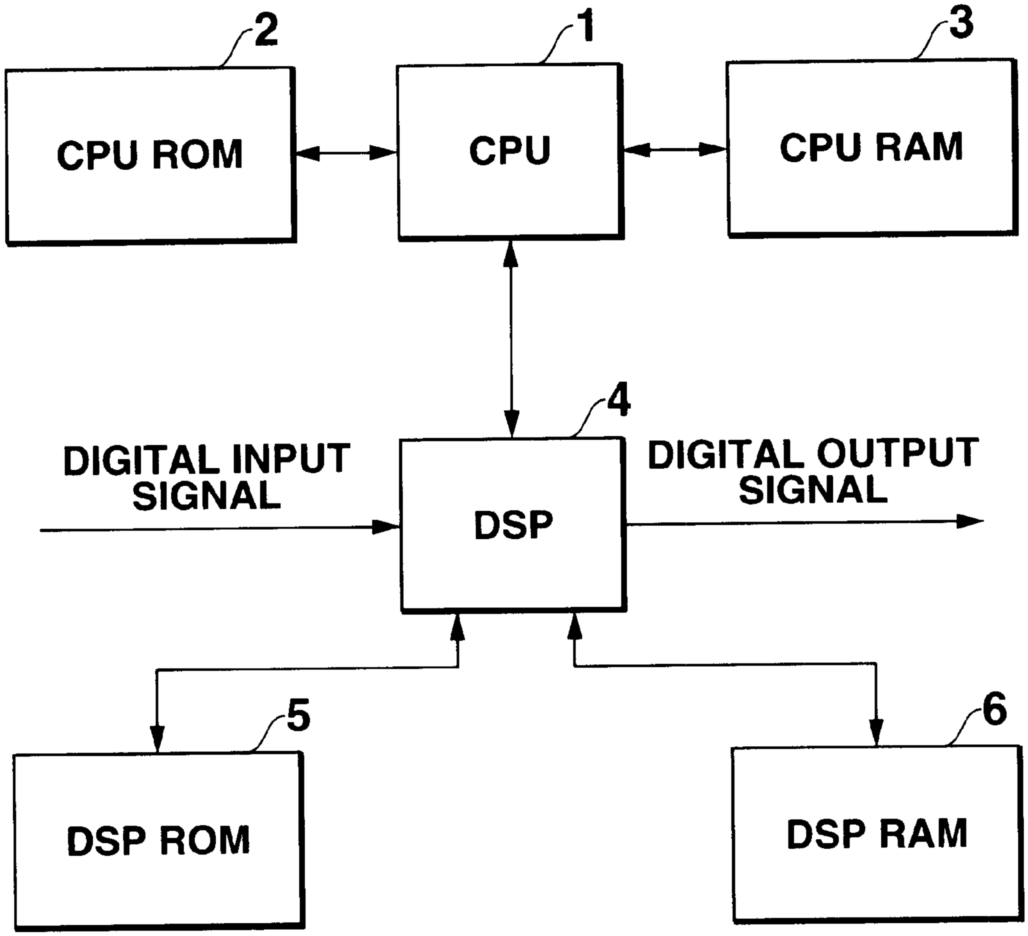
FIG. 1 is a block diagram showing a system arrangement of a tone control apparatus in accordance with embodiments of the invention.

FIG. 1 shows a system arrangement of a tone control apparatus in accordance with the embodiments of the invention. CPU 1 is connected to CPU ROM 2, CPU RAM 3 and DSP 4 and controls the entire system via commands and data communication. CPU ROM 2 stores a program which is run by CPU 1. CPU ROM 2 also stores data. Part by of the stored data constitute a plurality of modules representative of signal processing algorithms according to which a tone signal is processed. CPU RAM 4 is used as a work memory of CPU 1.

DSP 4 processes a digital input tone signal according to a plurality of signal processing algorithms to output the processed tone signal as digital output tone signal. The signal processing algorithms are sequentially executed to perform required tone signal processings, such as, vibrato processing, effect processing, chorus processing and other tone signal processings. DSP 4 is connected to DSP ROM 5 and DSP RAM 6. DSP ROM 5 stores a tone control program and initial data and table for signal processing by DSP 4.

DSP RAM 6 receives and stores a plurality of signal processing modules from CPU 1. DSP RAM 6 is a DSP storage resource. Each signal processing module includes a plurality of data groups (e.g., program, fixed data, work data).

Figure 2:
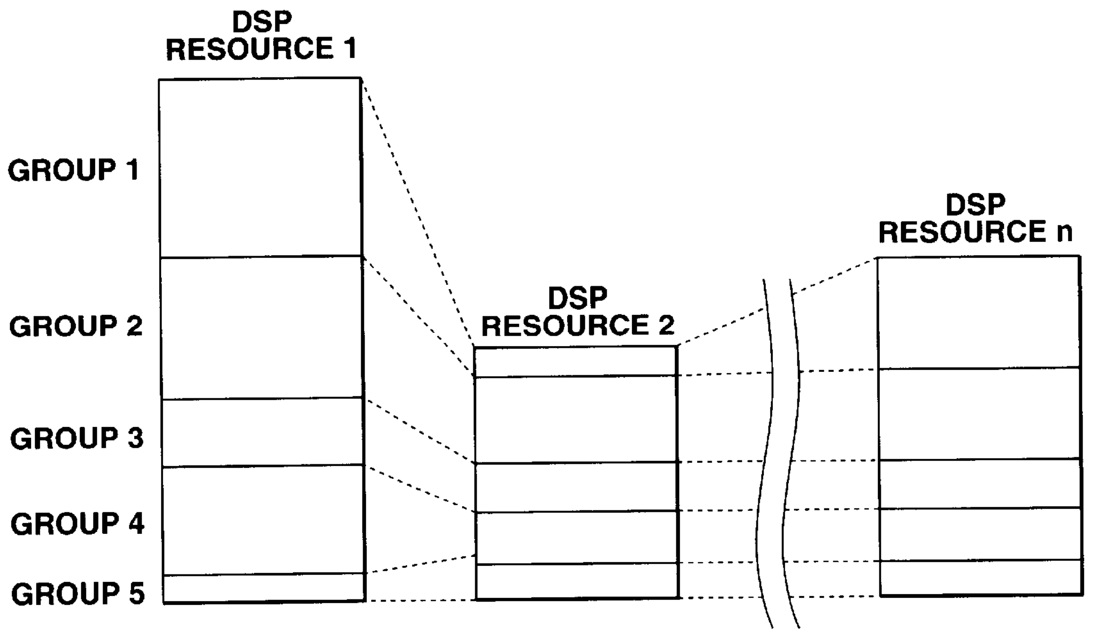
FIG. 2 is a diagram showing DSP storage resource assignment.

As shown in FIG. 2, DSP RAM 6 is divided into a plurality of storage areas, designated DSP resource 1, DSP resource 2, and so on, and DSP resource n. Each DSP resource i is assigned to a different one of the plurality of data groups. In addition, each DSP resource i is divided into a plurality of division areas, designated GROUP 1, GROUP 2 and so on for the plurality of signal processing modules. Thus, corresponding division areas (e.g., GROUP 1 division areas) in the plurality of DSP resources 1 to n are arranged to store one of the plurality of signal processing modules (e.g., first one).

Figure 3:
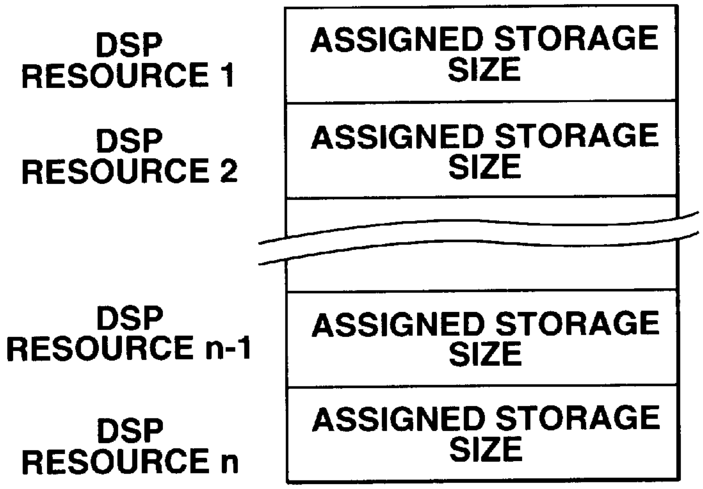
FIG. 3 is a diagram showing an assigned storage size for respective DSP resources.
Figure 4:
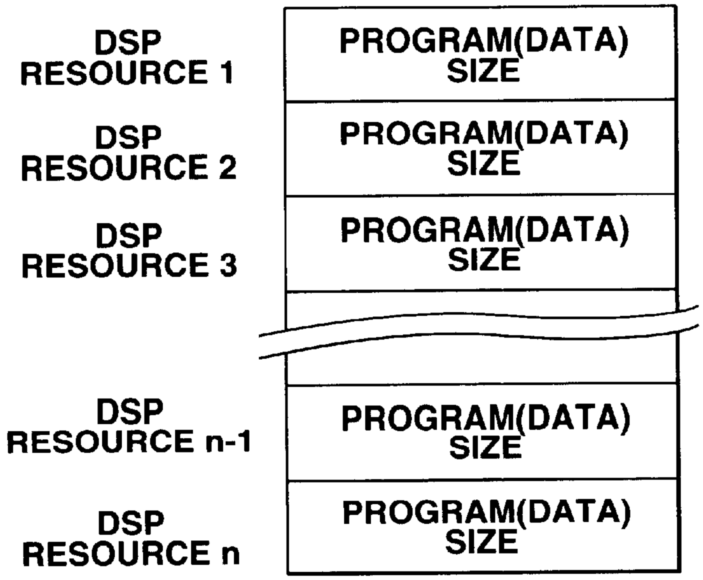
FIG. 4 is a diagram showing a size of a program or data required for respective DSP resources.

FIG. 3 shows storage sizes assigned to or reserved for respective DSP resources. FIG. 4 shows sizes of data or program to be stored in DSP resources. In general, the size of a storage must be greater than or equal to the required data size to be stored in it. In the embodiments, it is assumed that a division area for storing processing information (program or fixed data) is equal in size to the processing information whereas a division area or work area for storing information to be processed (work data) may be greater in size than the work data.

The operation of the first embodiment is now described with reference to flow charts of CPU 1 and DSP 4.

Figure 5:
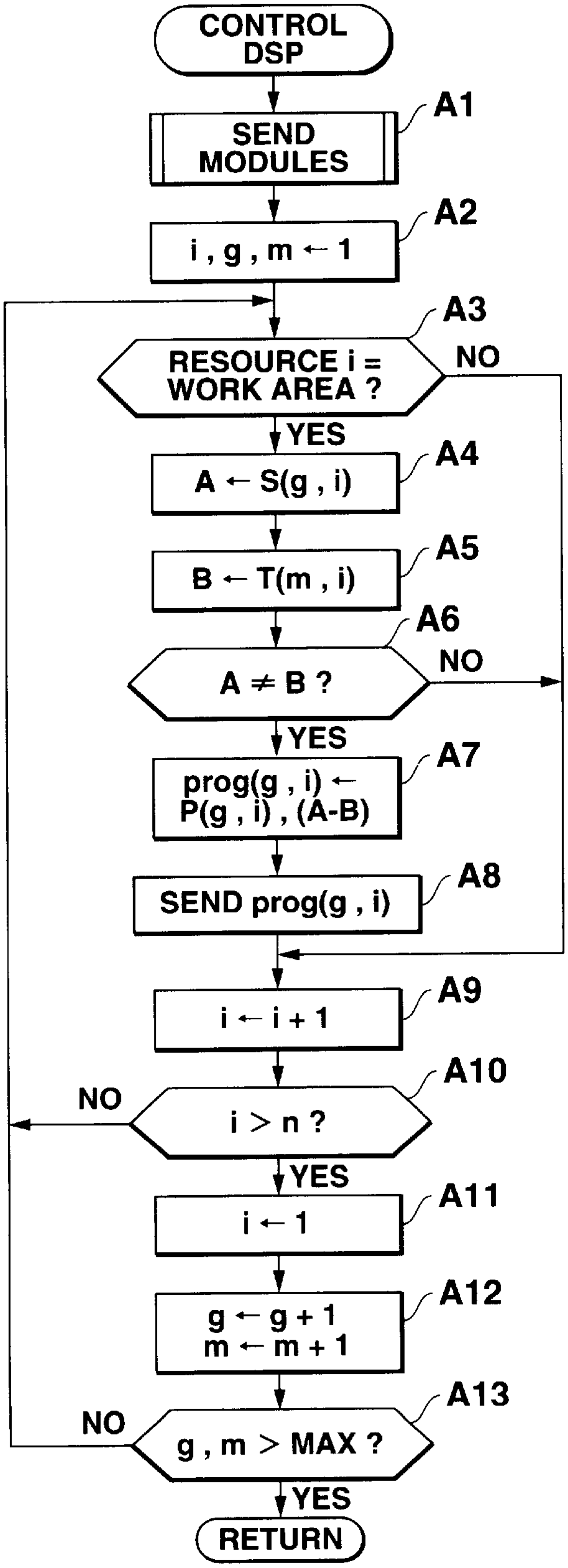
FIG. 5 is a flow chart of a control DSP routine executed by CPU in accordance with the first embodiment of the invention.
Figure 6:
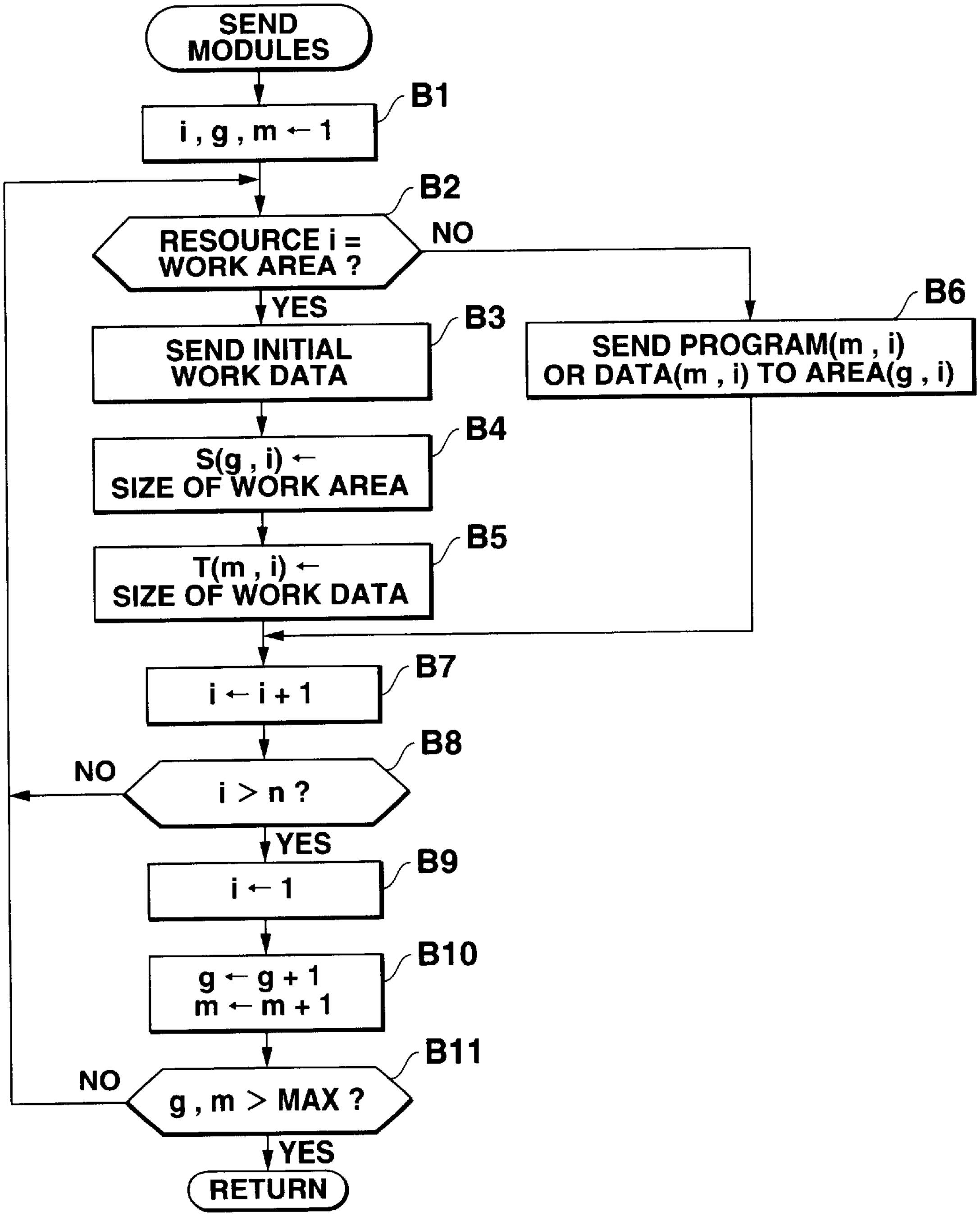
FIG. 6 is a flow chart of a send modules routine in FIG. 5.

FIG. 5 is a flow chart of a control DSP routine executed by CPU 1. Block A 1 (send modules routine) sends a plurality of signal processing modules to DSP 4. FIG. 6 shows a flow chart of the send modules routine A1. Block B1 initializes pointer i, g and m to "1". The pointer i points to a DSP resource. The pointer g points to a group (see FIG. 2). The pointer m points to a module. After the block B1, the routine A1 executes the following loop while incrementing the pointers.

Specifically, block B2 checks if DSP resource i (pointed to by pointer i) is a work area. In the affirmative, block B3 sends initial work data (if any) to the division work area (g. i) in the DSP resource i. Block B5 loads the size of the work area (g. i) to table S (g. i). Block loads the size of the work data to table T (m, i). If block B2 has found that DSP resource i is a non-work area(i.e., program or fixed data area), block B6 sends program (m, i) or data (m, i) to the division area (g, i).

After block B5 or B6, block B7 increments the resource pointer i, thus pointing to the next resource. Block B7 checks if i has exceeded the number of resources n. In the negative, the routine repeats the blocks B2 to B7. If i>n (B8), block B9 reinitializes the pointer i to "1". Block B10 increments the group pointer g and module pointer m, thus pointing to the next group and module. Block B11 checks if g or m has exceeded the maximum MAX, indicative of end of transfer of modules. If there is more module to be sent, the routine repeats blocks B2 to B10. Having sent all modules (B11), the routine returns to the flow in FIG. 5.

Returning the FIG. 5, after block A1, block A2 initializes the pointers i, g and m to "1". Then the control DSP routine executes the following loop while incrementing the pointers. Specifically, block A3 checks if the resource i (pointed to by pointer i) is a work area. In the affirmative, block A4 loads the size of the work division area, S (g, i) into register A. Block A5 loads the size of the work data, T (m,i) into register B. Block A6 checks if the storage size A is equal to the data size B.

Figure 5A:
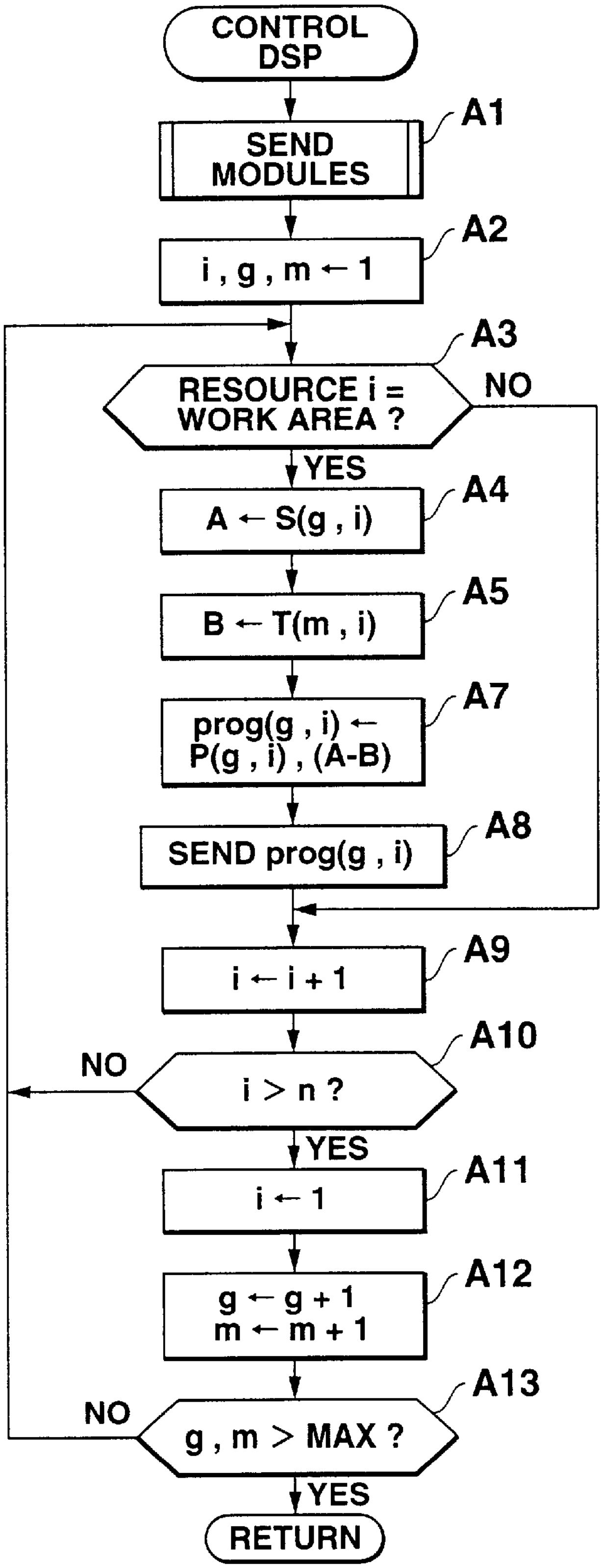
FIG. 5A is a flow chart of a control DSP routine executed by CPU in accordance with an alternate embodiment of the invention.

In the negative, indicating that the storage size A of the division are is greater than the data size B, block A7 loads address change command P (g,i) and size difference (A–B) into register prog (g,i). Block A8 sends prog (g,i) to DSP 4. If desired, the block A6 may be omitted so that the routine always sends prog (g,i) to DSP 4 even if A–B=0 (see FIG. 5A). After block A8, or when block A3 has found that the resource i is a non-work area, or when the block A6 has found storage size A equal to data size B, block A9 increments the pointer i, pointing to the next resource.

Then, block B10 checks if i has exceeded the number of resources n. In the negative, the routine repeats the blocks A3 to A9. When i has exceeded the number of resources n (block A10), block A11 reinitializes the pointer i to "1". Block A12 increments group and module pointers g and m, thus pointing to the next group and next module. Block A13 checks if g or m has exceeded the maximum MAX. In the negative, the routine repeats the blocks A3 to A12. In the affirmative, the control DSP routine returns to a main routine (not shown).

Figure 7:
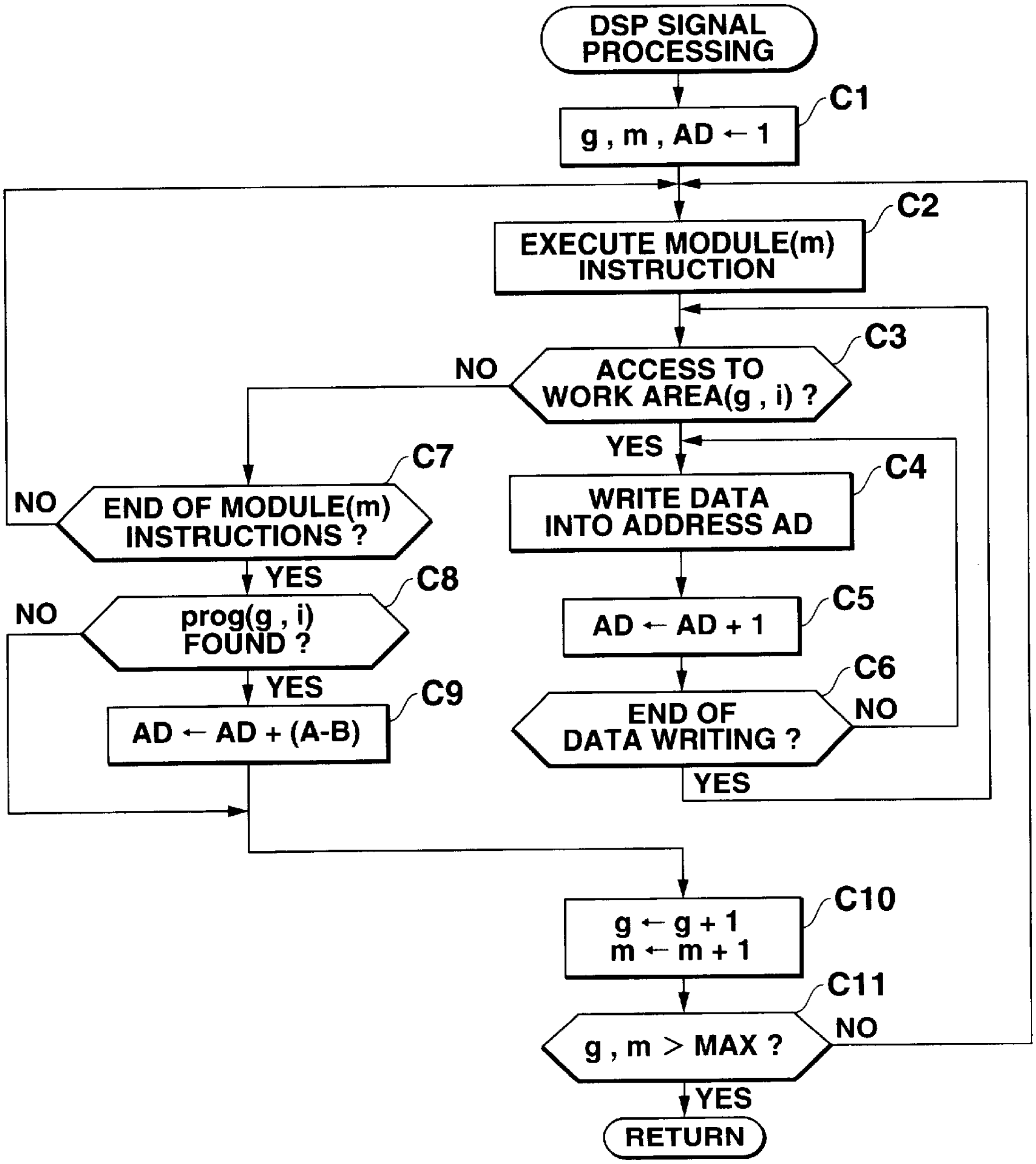
FIG. 7 is a flow chart of DSP signal processing in accordance with the first embodiment.

FIG. 7 is a flow chart showing a signal processing routine executed by DSP 4. Block C 1 initializes group pointer g, module pointer m and resource address pointer AD to "1". Then the routine executes the following loop while incrementing pointers g and m. Specifically, block C2 executes a module (m) instruction. Block C3 checks if the module (m) instruction involves access to work area (g. i). In the affirmative, block C4 writes processed data into the work area (g, i) at address specified by AD. Block C5 increments the pointer AD. Blocks C6 checks if there remain more processed data to be stored. In the affirmative, the routine returns to block C4. In the negative routine returns to block C3.

When block C3 has found that there is no more access to work area (g, i), block C7 checks if executing the module (m) has been completed. In the negative, the routine returns to block C2 to repeat the process. In the affirmative, block C8 checks if there is prog (g, i). If prog (g, i) is found, block C9 adds size difference data (A–B) in prog (g, i) to AD that has been set to the last address of the work data plus one (see C5). Thus, the resultant AD points to the start address of the work area (g+1, i) for the next module. This is also the case when the storage size A of the work area (g, i) is equal to the data size B of the work data or when no prog (g, i) is found.

Having determined the start address of the work area for the next module, the routine executes the block C10 to increment the pointers g and m, pointing to the next group and next module. Block C11 checks if g or m has exceeded the maximum MAX. In the negative, the routine returns to block C2 to repeat the process. In the affirmative, the DST signal processing routine returns to a main routine (not shown).

In this manner, the first embodiment uses DSP RAM 6 as storage means for storing a plurality of signal processing modules representative of algorithms according to which a tone signal is processed. Each signal processing module includes a plurality of data groups (e.g., program, fixed data, work data). The storage means (DSP RAM 6) includes a plurality of storage areas each assigned to a different one of the plurality of data groups. Each storage area is divided into a plurality of division areas for the plurality of signal processing modules. CPU 1 transfers the plurality of signal processing modules to DSP RAM 6 in such a manner that corresponding division areas in the plurality of storage areas store one of the plurality of signal processing modules. CPU 1 also transfers to DSP 4 address qualifying information or difference between size of a specified data group (work data group) for a signal processing module and size of a specified division area (work area) that stores the work data group for the signal processing module.

DSP 4 sequentially executes the plurality of signal processing modules. When it has completed executing the current signal processing module, DSP 4 determines the start address of the specified division area (work area) for the next signal processing module from the address qualifying information.

Therefore, the tone control apparatus of the first embodiment can successfully address the next specified division area for the next signal processing module.

The operation of the second embodiment is now described with reference to flow charts of CPU 1 and DSP 4.

Figure 8:
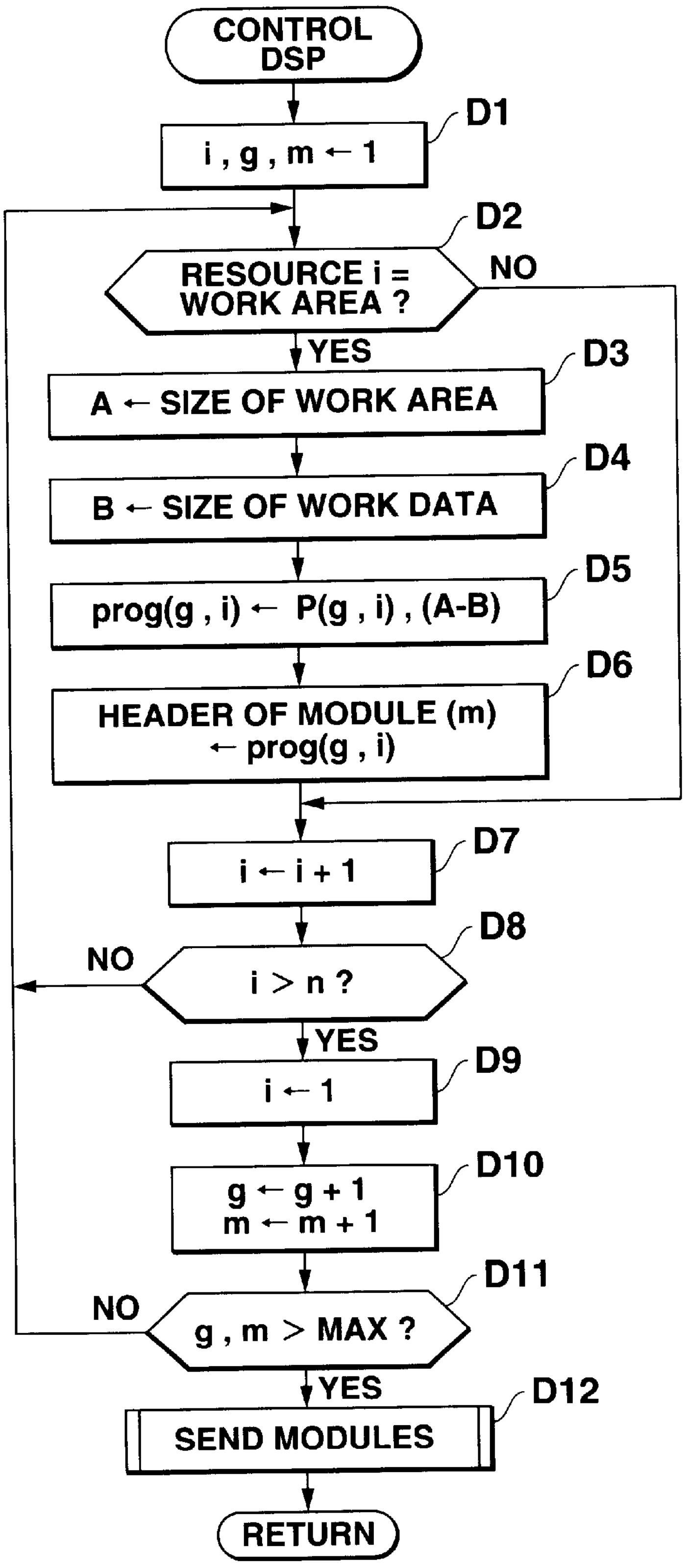
FIG. 8 is a flow chart of the control DSP routine executed by CPU in accordance with the second embodiment of the invention.

FIG. 8 is a flow chart of a control DSP routine executed by CPU 1.

Block D1 initializes the pointers i, g and m to "1". Then the control DSP routine executes the following loop while incrementing the pointers. Specifically, block D2 checks if the resource i (pointed to by pointer i) is a work area. In the affirmative, block D3 loads the size of the work division area into register A. Block D4 loads the size of the work data into register B. Block D5 loads address change command P (g, i) and size difference (A–B) into register prog (g, i). Block D6 loads prog (g, i) into header of module (m). After block D6, or when block D2 has found that the resource i is a non-work area, block D7 increments the pointer i, pointing to the next resource.

Then, block D8 checks if i has exceeded the number of resources n. In the negative, the routine repeats the blocks D2 to D7. When i has exceeded the number of resources n (block D8), block D9 reinitializes the pointer i to "1". Block D10 increments group and module pointers g and m, thus pointing to the next group and next module. Block D11 checks if g or m has exceeded the maximum MAX. In the negative, the routine repeats the blocks D2 to D10. In the affirmative, block D12 sends modules. Then, the control DSP routine returns to a main routine (not shown).

Figure 9:
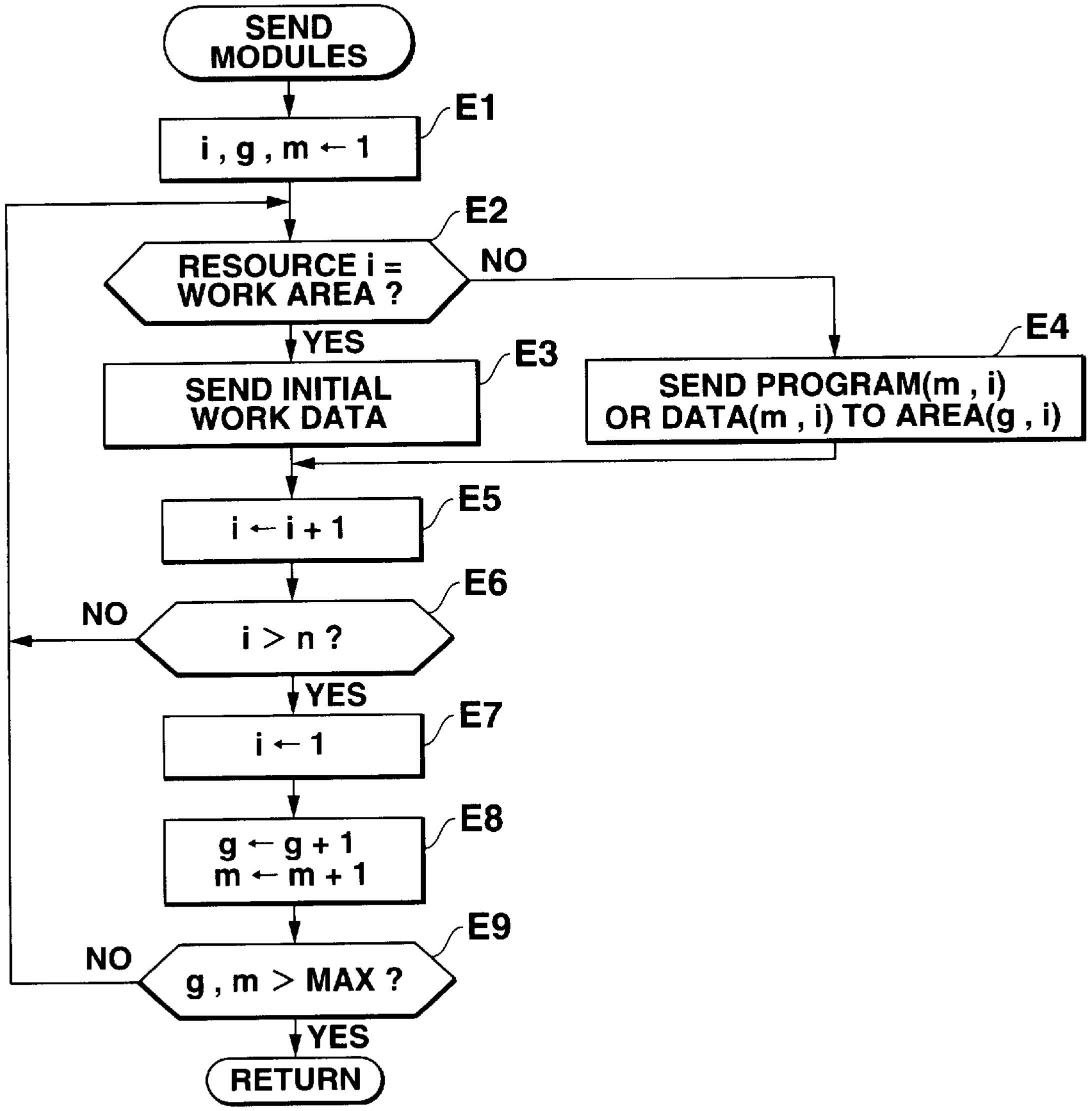
FIG. 9 is a flow chart of the send modules routine in FIG. 8.

FIG. 9 shows a flow chart of the send modules routine D12. Block E1 initializes pointer i, g and m to "1". The pointer i points to a DSP resource. The pointer g points to a group (see FIG. 2). The pointer m points to a module. After the block E1, the routine D12 executes the following loop while incrementing the pointers.

Specifically, block E2 checks if DSP resource i (pointed to by pointer i) is a work area. In the affirmative, block E3 sends initial work data (if any) to the division work area (g. i) in the DSP resource i. If block E2 has found that DSP resource i is a non-work area(i.e., program or fixed data area), block E4 sends program (m, i) or data (m, i) to the division area (g, i).

After block E3 or E4, block E5 increments the resource pointer i, thus pointing to the next resource. Block E6 checks if i has exceeded the number of resources n. In the negative, the routine repeats the blocks E2 to E5. If i>n (E6), block E7 reinitializes the pointer i to "1". Block E8 increments the group pointer g and module pointer m, thus pointing to the next group and module. Block E9 checks if g or m has exceeded the maximum MAX, indicative of end of transfer of modules. If there is more module to be sent, the routine repeats blocks E2 to E8. Having sent all modules (E9), the routine returns to the flow in FIG. 8.

Figure 10:
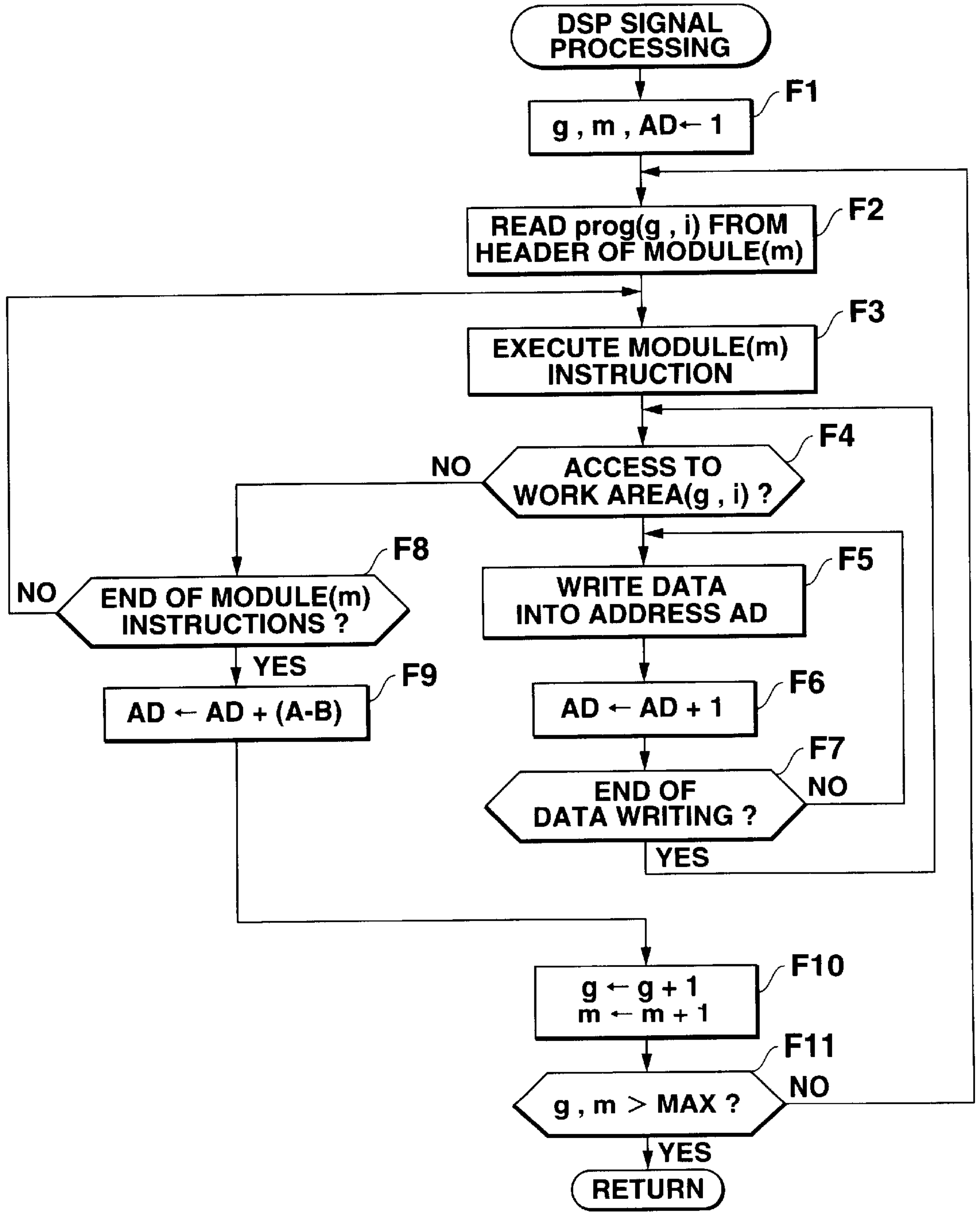
FIG. 10 is a flow chart of the DSP signal processing in accordance with the second embodiment.

FIG. 10 is a flow chart showing a signal processing routine executed by DSP 4. Block F 1 initializes group pointer g, module pointer m and resource address pointer AD to "1". Then the routine executes the following loop while incrementing pointers g and m. Specifically, block F2 reads size difference data (A–B) in prog (g, i) from module (m) header. Block F3 executes a module (m) instruction. Block F4 checks if the module (m) instruction involves access to work area (g. i). In the affirmative, block F5 writes processed data into the work area (g, i) at address specified by AD. Block F6 increments the pointer AD. Blocks F7 checks if there remain more processed data to be stored. In the affirmative, the routine returns to block F5. In the negative routine returns to block F4.

When block F4 has found that there is no more access to work area (g, i), block F8 checks if executing the module (m) has been completed. In the negative, the routine returns to block F3 to repeat the process. In the affirmative, block F9 adds size difference data (A–B) to AD that has been set to the last address of the work data plus one (see F6). Thus, the resultant AD points to the start address of the work area (g+1, i) for the next module. Having determined the start address of the work area for the next module, the routine executes the block F10 to increment the pointers g and m, pointing to the next group and next module. Block F11 checks if g or m has exceeded the maximum MAX. In the negative, the routine returns to block F2 to repeat the process. In the affirmative, the DST signal processing routine returns to a main routine (not shown).

In this manner, like the first embodiment, the second embodiment can successfully address the next specified division area for the next signal processing module by using the address qualifying information on the difference between the size of a specified data group for a signal processing module and the size of a specified division area that stores the specified data group for the signal processing module. In the second embodiment, the address qualifying information (prog (g, i)) is transferred to DSP RAM 6 as part (header) of the signal processing module.

The first and second embodiments use a work area as a specified division area for storing a specified data group (work data).

In accordance with the invention, the specified data group can be a program or fixed data. The specified division area can be a program area or fixed data area. The required modification will be obvious to a person having ordinal skill in the art from the teachings of the invention.

The embodiments are applied to an apparatus which runs a tone control program stored in CPU ROM 2 and DSP RAM 6. Any other computer-readable second medium (e.g., floppy disk, CD) of a tone control program, such as the one according to the shown flow charts may be used.

What is claimed is:

1. An apparatus for tone control, comprising:

storage means for storing a plurality of signal processing modules representative of algorithms according to which a tone signal is processed, each of said plurality of signal processing modules including a plurality of data groups;

said storage means including a plurality of storage areas for said plurality of signal processing modules, each of said storage areas being divided into a plurality of division areas, and each of said division areas being assigned to a different one of said plurality of data groups;

transfer means for transferring said plurality of signal processing modules to said storage means in such a manner that corresponding division areas in said plurality of storage areas store one of said plurality of data groups;

address qualifying information transfer means for transferring address qualifying information that includes a size difference between a size of a specified data group of one of said signal processing modules and a size of a specified division area that stores the specified data group of said one of the signal processing modules, if the size of the specified division area is greater than the size of the specified data group, when said transfer means transfers the specified data group to the specified division area;

signal processing means for sequentially executing said plurality of signal processing modules to thereby process the tone signal; and address control means operable in response to an operation of the address qualifying means for determining a start address of a next specified division area for a next specified data group in accordance with the size difference in the address qualifying information when said signal processing means has completed executing the signal processing module including the specified data group.

2. The apparatus of claim 1, wherein said plurality of data groups of each of said plurality of signal processing modules comprises a data group of fixed data and a data group of work data.

3. The apparatus of claim 1, wherein said specified data group comprises a work data group, and said specified division area is used as a work area for storing said work data group.

4. A recording medium for storing a program readable by a computer for controlling the computer to function as:

storage means for storing a plurality of signal processing modules representative of algorithms according to which a tone signal is processed, each of said plurality of signal processing modules including a plurality of data groups;

said storage means including a plurality of storage areas for said plurality of signal processing modules, each of said storage areas being divided into a plurality of division areas, and each of said division areas being assigned to a different one of said plurality of data groups;

transfer means for transferring said plurality of signal processing modules to said storage means in such a manner that corresponding division areas in said plurality of storage areas store one of said plurality of data groups;

address qualifying information transfer means for transferring address qualifying information that includes a size difference between a size of a specified data group of one of said signal processing modules and a size of a specified division area that stores the specified data group of said one of the signal processing modules, if the size of the specified division area is greater than the size of the specified data group, when said transfer means transfers the specified data group to the specified division area;

signal processing means for sequentially executing said plurality of signal processing modules to thereby process the tone signal; and address control means operable in response to an operation of the address qualifying means for determining a start address of a next specified division area for a next specified data group in accordance with the size difference in the address qualifying information when said signal processing means has completed executing the signal processing module including the specified data group.

5. An apparatus for tone control, comprising:

storage means for storing a plurality of signal processing modules representative of algorithms according to which a tone signal is processed, each of said plurality of signal processing modules including a plurality of data groups;

said storage means including a plurality of storage areas for said plurality of signal processing modules, each of said storage areas being divided into a plurality of division areas, and each of said division areas being assigned to a different one of said plurality of data groups;

transfer means for transferring said plurality of signal processing modules to said storage means in such a manner that corresponding division areas in said plurality of storage areas store one of said plurality of data groups;

address qualifying information transfer means for transferring address qualifying information that includes a size difference between a size of a specified data group of one of said signal processing modules and a size of a specified division area that stores the specified data group of said one of the signal processing modules, when said transfer means transfers the specified data group to the specified division area;

signal processing means for sequentially executing said plurality of signal processing modules to thereby process the tone signal; and address control means for determining a start address of a next specified division area for a next specified data group in accordance with the size difference in the address qualifying information when said signal processing means has completed executing the signal processing module including the specified data group.

6. The apparatus of claim 5, wherein said plurality of data groups of each of said plurality of signal processing modules comprises a data group of fixed data and a data group of work data.

7. The apparatus of claim 5, wherein said specified data group comprises a work data group, and said specified division area is used as a work area for storing said work data group.

8. A recording medium for storing a program readable by a computer for controlling the computer to function as:

storage means for storing a plurality of signal processing modules representative of algorithms according to which a tone signal is processed, each of said plurality of signal processing modules including a plurality of data groups;

said storage means including a plurality of storage areas for said plurality of signal processing modules, each of said storage areas being divided into a plurality of division areas, and each of said division areas being assigned to a different one of said plurality of data groups;

transfer means for transferring said plurality of signal processing modules to said storage means in such a manner that corresponding division areas in said plurality of storage areas store one of said plurality of data groups;

address qualifying information transfer means for transferring address qualifying information that includes a size difference between a size of a specified data group of one of said signal processing modules and a size of a specified division area that stores the specified data group of said one of the signal processing modules, when said transfer means transfers the specified data group to the specified division area;

signal processing means for sequentially executing said plurality of signal processing modules to thereby process the tone signal; and address control means for determining a start address of a next specified division area for a next specified data group in accordance with the size difference in the address qualifying information when said signal processing means has completed executing the signal processing module including the specified data group.

* * * * *

UNITED STATES PATENT AND TRADEMARK OFFICE

CERTIFICATE OF CORRECTION

PATENT NO. : 6,772,023 B1
DATED : August 3, 2004
INVENTOR(S) : Takeshi Imai

It is certified that error appears in the above-identified patent and that said Letters Patent is hereby corrected as shown below:

Title page,
Item [56], References Cited, U.S. PATENT DOCUMENTS,
insert -- 5,381,360 1/1995 Shridhar et al.
5,623,621 4/1997 Garde
5,659,700 8/1997 Chen et al. --.

Signed and Sealed this

Sixteenth Day of May, 2006

JON W. DUDAS
*Director of the United States Patent and Trademark Office*